(12) United States Patent
Pamplin

(10) Patent No.: US 12,329,322 B2
(45) Date of Patent: Jun. 17, 2025

(54) POWER BOOST MODE FOR A BLENDER

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( * ) Notice: Subject to any disclaimer, the term of this patent is extended or adjusted under 35 U.S.C. 154(b) by 101 days.

(21) Appl. No.: 18/346,526

(22) Filed: Jul. 3, 2023

(65) Prior Publication Data

US 2023/0380632 A1 Nov. 30, 2023

Related U.S. Application Data

(63) Continuation of application No. 17/118,257, filed on Dec. 10, 2020, now Pat. No. 11,690,482.

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *A47J 43/0722* (2013.01); *A47J 43/0761* (2013.01); *B01F 27/808* (2022.01); *B02C 25/00* (2013.01); *H02J 7/0042* (2013.01); *H02J 7/0048* (2020.01); *H02J 7/02* (2013.01);
(Continued)

(58) Field of Classification Search
CPC .... B01F 27/808; B01F 2101/06; B02C 25/00; H02J 7/0042; H02J 7/0048; H02J 7/02; H02J 50/10; H02K 7/145; H02P 2205/07; H02P 29/40
See application file for complete search history.

(56) References Cited

U.S. PATENT DOCUMENTS 903,927 A 11/1908 Wendler
2,086,858 A 7/1937 Dunkelberger
(Continued)

FOREIGN PATENT DOCUMENTS

CA 195728 1/1920
CN 201398891 2/2010
(Continued)

OTHER PUBLICATIONS

Mialoe Portable Blender, posted at Amazon.com on Oct. 12, 2017, [site visited Oct. 23, 2023]. Available from internet, URL: https://www.amazon.com/dp/B076DJ3DKK/> (Year: 2017).
(Continued)

*Primary Examiner* — Jared O Brown
(74) *Attorney, Agent, or Firm* — Esplin & Associates PC

(57) ABSTRACT

A blender using different power modes is disclosed. Exemplary implementations may include a base assembly, a container assembly, an electrical motor, a blending component, a control interface, control circuitry, and/or other components. The control circuitry may be configured to make different types of detections related to the availability and/or usage of electrical power, and may control the electrical motor using at least two different power modes of operation, thus providing different amounts of power to the electrical motor in different power modes of operation.

19 Claims, 8 Drawing Sheets

(51) Int. Cl.
*B01F 27/808* (2022.01)
*B01F 101/06* (2022.01)
*B02C 25/00* (2006.01)
*H02J 7/00* (2006.01)
*H02J 7/02* (2016.01)
*H02J 50/10* (2016.01)
*H02K 7/14* (2006.01)

(52) U.S. Cl.
CPC ........... *H02J 50/10* (2016.02); *B01F 2101/06* (2022.01); *H02K 7/145* (2013.01)

(56) References Cited

U.S. PATENT DOCUMENTS

| | | |
|---|---|---|
| D114,673 S | 5/1939 | Cravaritis |
| D123,477 S | 11/1940 | Fetman et al. |
| 2,250,142 A | 7/1941 | Umstead |
| 2,282,866 A | 5/1942 | Hagen |
| D182,306 S | 3/1958 | Rutan |
| D202,469 S | 10/1965 | Davis |
| 3,262,626 A | 7/1966 | Davis |
| 3,931,494 A | 1/1976 | Fisher |
| D242,302 S | 11/1976 | Madi |
| 4,095,090 A | 6/1978 | Pianezza |
| D260,350 S | 8/1981 | Kahlcke |
| 4,435,084 A | 3/1984 | Calhoun |
| D274,792 S | 7/1984 | Price |
| 4,487,509 A | 12/1984 | Boyce |
| 4,497,580 A | 2/1985 | Doyel |
| 4,629,131 A | 12/1986 | Podell |
| 4,741,482 A | 5/1988 | Coggiola |
| 4,930,709 A | 6/1990 | Steffens |
| D315,475 S | 3/1991 | Finger |
| D327,818 S | 7/1992 | Haralson |
| D343,987 S | 2/1994 | Rotte |
| D347,144 S | 5/1994 | Brady |
| D349,650 S | 8/1994 | Lonczak |
| 5,425,579 A | 6/1995 | Sampson |
| 5,546,467 A | 8/1996 | Denenberg |
| 5,639,161 A | 6/1997 | Sirianni |
| 5,720,552 A | 2/1998 | Schindlegger |
| D394,986 S | 6/1998 | Lallemand |
| 5,908,037 A | 6/1999 | Pierson |
| 5,911,504 A | 6/1999 | Schindlegger, Jr. |
| D417,815 S | 12/1999 | Endres |
| D419,369 S | 1/2000 | Naft |
| D433,598 S | 11/2000 | Naft |
| D448,236 S | 9/2001 | Murray |
| 6,331,070 B1 | 12/2001 | Desai |
| D455,324 S | 4/2002 | Wright |
| 6,418,227 B1 | 7/2002 | Kuo |
| D471,455 S | 3/2003 | Laveault |
| 6,532,863 B1 | 3/2003 | Lee |
| 6,568,843 B1 | 5/2003 | Lai |
| D478,530 S | 8/2003 | Sachuk |
| 6,614,206 B1 | 9/2003 | Wong |
| 6,796,705 B1 | 9/2004 | Khubani |
| D499,606 S | 12/2004 | Feil |
| D504,818 S | 5/2005 | Bakic |
| 6,962,432 B2 | 11/2005 | Hofeldt |
| D518,994 S | 4/2006 | Lin |
| D519,314 S | 4/2006 | Blaise |
| D522,318 S | 6/2006 | Mcguyer |
| D536,975 S | 2/2007 | Smith |
| D548,523 S | 8/2007 | Greenspon |
| D550,506 S | 9/2007 | Spitzer |
| D560,445 S | 1/2008 | Tardif |
| 7,314,307 B2 | 1/2008 | Cai |
| 7,364,348 B1 | 4/2008 | Jones |
| 7,384,182 B2 | 6/2008 | Bhavnani |
| 7,422,362 B2 | 9/2008 | Sands |
| D580,702 S | 11/2008 | Holcomb |
| D587,136 S | 2/2009 | Friebe |
| 7,518,343 B2 | 4/2009 | Veselic |
| D591,589 S | 5/2009 | Myers |
| D603,215 S | 11/2009 | Hollinger |
| D603,704 S | 11/2009 | Jost |
| D604,101 S | 11/2009 | Sands |
| D617,145 S | 6/2010 | Picozza |
| D620,756 S | 8/2010 | Lown |
| D621,206 S | 8/2010 | Matta |
| 7,766,540 B2 | 8/2010 | Saunders |
| D624,359 S | 9/2010 | Schleinzer |
| 7,878,702 B2 | 2/2011 | Peng |
| D634,155 S | 3/2011 | Duncan |
| D635,019 S | 3/2011 | Goto |
| 7,938,574 B2 | 5/2011 | Mcgill |
| D640,502 S | 6/2011 | Picozza |
| D640,556 S | 6/2011 | Bragg |
| D647,365 S | 10/2011 | Audette |
| 8,056,848 B1 | 11/2011 | Liang |
| D654,305 S | 2/2012 | Gursel |
| D655,981 S | 3/2012 | Gursel |
| D663,202 S | 7/2012 | Biesecker |
| D669,304 S | 10/2012 | Bock |
| D679,935 S | 4/2013 | Tse |
| D682,030 S | 5/2013 | Ezechukwu |
| D684,817 S | 6/2013 | Leavitt |
| D686,869 S | 7/2013 | Shoshan |
| D690,152 S | 9/2013 | Palermo |
| D697,798 S | 1/2014 | Sorensen |
| D699,515 S | 2/2014 | Kim |
| D700,013 S | 2/2014 | Chu |
| D701,615 S | 3/2014 | Pluska |
| D708,902 S | 7/2014 | Audette |
| D709,325 S | 7/2014 | Guo |
| D716,096 S | 10/2014 | Krooshof |
| 8,851,739 B2 | 10/2014 | Gonzalez |
| 8,950,930 B2 | 2/2015 | Wang |
| D723,872 S | 3/2015 | Kostler |
| D728,302 S | 5/2015 | Vu |
| D729,573 S | 5/2015 | Moon |
| 9,035,222 B2 | 5/2015 | Alexander |
| 9,039,274 B1 | 5/2015 | Corda |
| D731,242 S | 6/2015 | Machovina |
| 9,049,967 B1 | 6/2015 | Golino |
| 9,134,020 B1 | 9/2015 | Wells |
| D742,683 S | 11/2015 | Kim |
| D746,629 S | 1/2016 | Ji |
| D752,381 S | 3/2016 | Wahl |
| D755,004 S | 5/2016 | Bock |
| D758,799 S | 6/2016 | Audette |
| 9,364,806 B2 | 6/2016 | King |
| D760,586 S | 7/2016 | Seiders |
| D761,056 S | 7/2016 | Kemker |
| D761,616 S | 7/2016 | Picozza |
| D765,462 S | 9/2016 | Davies |
| D765,463 S | 9/2016 | Affatato |
| D765,464 S | 9/2016 | Affatato |
| D770,228 S | 11/2016 | Pan |
| D771,999 S | 11/2016 | Kettavong |
| 9,549,639 B2 | 1/2017 | Garr |
| D782,866 S | 4/2017 | Suess |
| D782,867 S | 4/2017 | Steel |
| D784,071 S | 4/2017 | Davies |
| D784,808 S | 4/2017 | Berroa García |
| D785,402 S | 5/2017 | Shirley |
| D786,614 S | 5/2017 | Smith |
| D789,139 S | 6/2017 | Repac |
| D789,735 S | 6/2017 | Palermo |
| D792,150 S | 7/2017 | Sun |
| D793,803 S | 8/2017 | Patel |
| D794,385 S | 8/2017 | Lee |
| D795,008 S | 8/2017 | Eyal |
| D798,668 S | 10/2017 | Steel |
| D799,963 S | 10/2017 | Akiyama |
| D801,109 S | 10/2017 | Lee |
| 9,775,467 B2 | 10/2017 | Sapire |
| 9,787,130 B2 | 10/2017 | Kim |
| 9,801,498 B2 | 10/2017 | Fach |
| 9,814,331 B2 | 11/2017 | Alexander |
| D804,258 S | 12/2017 | Kim |
| D804,910 S | 12/2017 | Steel |
| 9,839,326 B2 | 12/2017 | Sapire |

(56) References Cited

U.S. PATENT DOCUMENTS

| | | |
|---|---|---|
| D809,344 S | 2/2018 | Guthrie |
| D811,806 S | 3/2018 | Bock |
| D811,807 S | 3/2018 | Gollnick |
| D811,808 S | 3/2018 | Palermo |
| D815,486 S | 4/2018 | Suess |
| D816,394 S | 5/2018 | Yeung |
| D816,399 S | 5/2018 | Burns |
| D816,400 S | 5/2018 | Beckman |
| D816,994 S | 5/2018 | Fischer |
| D817,080 S | 5/2018 | Seidl |
| 10,010,213 B2 | 7/2018 | Alexander |
| D826,631 S | 8/2018 | Baron |
| D829,042 S | 9/2018 | Duan |
| D829,496 S | 10/2018 | Kim |
| D830,766 S | 10/2018 | Treacy |
| D832,641 S | 11/2018 | Sapire |
| D833,804 S | 11/2018 | Huang |
| D836,385 S | 12/2018 | Arzunyan |
| 10,143,980 B1 | 12/2018 | Marko |
| D839,054 S | 1/2019 | Rane |
| 10,188,229 B2 | 1/2019 | Alexander |
| D842,020 S | 3/2019 | Augustyn |
| D842,027 S | 3/2019 | Boroski |
| 10,219,655 B2 | 3/2019 | Van Der Gaag |
| D844,371 S | 4/2019 | Chalk |
| D844,372 S | 4/2019 | Deleo |
| D847,557 S | 5/2019 | Kraemer |
| 10,299,629 B2 | 5/2019 | Bascom |
| 10,299,632 B2 | 5/2019 | Vu |
| D850,205 S | 6/2019 | Hotell |
| D850,259 S | 6/2019 | Wiggins |
| D850,845 S | 6/2019 | Pan |
| D853,184 S | 7/2019 | De Groote |
| 10,362,903 B2 | 7/2019 | Mizrahi |
| D856,083 S | 8/2019 | Lawson-Shanks |
| 10,383,482 B1 * | 8/2019 | Pamplin ............... A47J 43/0766 |
| 10,391,461 B2 | 8/2019 | Alfoudari |
| 10,399,050 B1 | 9/2019 | Bertsch |
| D862,235 S | 10/2019 | Sanghavi |
| D863,888 S | 10/2019 | Meyers |
| D865,447 S | 11/2019 | Meyers |
| D865,458 S | 11/2019 | Kim |
| D867,806 S | 11/2019 | Bodum |
| D867,807 S | 11/2019 | Bodum |
| D871,831 S | 1/2020 | Liu |
| D873,601 S | 1/2020 | Sirju |
| D873,616 S | 1/2020 | Kaiser |
| D878,864 S | 3/2020 | Lawson-Shanks |
| D879,560 S | 3/2020 | Lowette |
| 10,617,260 B2 | 4/2020 | Sapire |
| D885,124 S | 5/2020 | Yessin |
| D885,824 S | 6/2020 | Neputy |
| D889,260 S | 7/2020 | Hiltser |
| D891,191 S | 7/2020 | Binyk |
| 10,702,837 B1 | 7/2020 | Pamplin |
| 10,714,116 B2 | 7/2020 | Tintor |
| D894,679 S | 9/2020 | Cheng |
| D895,348 S | 9/2020 | Vignau-Lous |
| D896,566 S | 9/2020 | Wang |
| D897,782 S | 10/2020 | Lane |
| D899,186 S | 10/2020 | Mclean |
| 10,792,630 B1 | 10/2020 | Pamplin |
| 10,799,071 B2 | 10/2020 | Pamplin |
| D900,530 S | 11/2020 | Kim |
| 10,828,612 B1 | 11/2020 | Pamplin |
| D903,400 S | 12/2020 | Li |
| D904,822 S | 12/2020 | Koszylko |
| D904,823 S | 12/2020 | Fransen |
| D905,494 S | 12/2020 | Pataki |
| D905,496 S | 12/2020 | Pamplin |
| D907,433 S | 1/2021 | Meyers |
| D907,593 S | 1/2021 | Nunomura |
| D908,428 S | 1/2021 | Pamplin |
| D911,107 S | 2/2021 | Pamplin |
| D913,035 S | 3/2021 | Mccabe |
| D916,549 S | 4/2021 | Li |
| 10,968,029 B1 | 4/2021 | Rane |
| D917,955 S | 5/2021 | Yao |
| D918,636 S | 5/2021 | Mangiarotti |
| D918,719 S | 5/2021 | Tamarindo |
| 11,006,784 B2 | 5/2021 | Pamplin |
| D920,736 S | 6/2021 | Bock |
| D921,418 S | 6/2021 | Thun |
| D921,419 S | 6/2021 | Yang |
| D922,133 S | 6/2021 | Ting |
| D924,621 S | 7/2021 | Bannister |
| D927,245 S | 8/2021 | Peng |
| D927,254 S | 8/2021 | Chen |
| D927,923 S | 8/2021 | Berg |
| D927,924 S | 8/2021 | Lane |
| D929,185 S | 8/2021 | Omdahl, II |
| D931,039 S | 9/2021 | Pamplin |
| D932,843 S | 10/2021 | Ames |
| D934,410 S | 10/2021 | Marsden |
| D935,276 S | 11/2021 | Lane |
| 11,229,891 B2 | 1/2022 | Pamplin |
| D942,802 S | 2/2022 | Deleo |
| D943,338 S | 2/2022 | Feng |
| D948,940 S | 4/2022 | Pamplin |
| D949,618 S | 4/2022 | Bodum |
| D951,097 S | 5/2022 | Hur |
| D953,096 S | 5/2022 | Gort-Barten |
| D953,103 S | 5/2022 | Pamplin |
| D960,659 S | 8/2022 | Seiders |
| D963,395 S | 9/2022 | Wu |
| D970,277 S | 11/2022 | Tanchette |
| D970,309 S | 11/2022 | Yu |
| D973,437 S | 12/2022 | Pamplin |
| D976,053 S | 1/2023 | Ci |
| D977,891 S | 2/2023 | Lin |
| D977,902 S | 2/2023 | Kim |
| D979,321 S | 2/2023 | Coakley |
| D980,669 S | 3/2023 | Shi |
| D981,179 S | 3/2023 | Pamplin |
| 11,602,243 B2 | 3/2023 | Fan |
| D985,329 S | 5/2023 | Shi |
| D986,671 S | 5/2023 | Guo |
| D987,363 S | 5/2023 | Wu |
| D988,799 S | 6/2023 | Endo |
| D990,212 S | 6/2023 | Hu |
| D991,743 S | 7/2023 | Kim |
| D994,423 S | 8/2023 | Meyers |
| D999,015 S | 9/2023 | Vue |
| D1,006,531 S | 12/2023 | Pamplin |
| D1,007,948 S | 12/2023 | Pamplin |
| D1,011,845 S | 1/2024 | Lamance |
| D1,027,656 S | 5/2024 | Wang |
| D1,028,611 S | 5/2024 | Pamplin |
| 2001/0036124 A1 | 11/2001 | Rubenstein |
| 2002/0117566 A1 | 8/2002 | Cheng |
| 2002/0141286 A1 | 10/2002 | Wulf |
| 2004/0159624 A1 | 8/2004 | Miller |
| 2005/0174882 A1 | 8/2005 | Krasne |
| 2007/0182367 A1 | 8/2007 | Partovi |
| 2007/0209528 A1 | 9/2007 | Chang |
| 2007/0221068 A1 | 9/2007 | Boussemart |
| 2007/0290555 A1 | 12/2007 | Caren |
| 2007/0297281 A1 | 12/2007 | Saunders |
| 2008/0198691 A1 | 8/2008 | Behar |
| 2008/0217284 A1 | 9/2008 | Roth |
| 2008/0221739 A1 | 9/2008 | Pryor |
| 2008/0259722 A1 | 10/2008 | Sanford |
| 2008/0265838 A1 | 10/2008 | Garg |
| 2009/0032627 A1 | 2/2009 | Krasznai |
| 2010/0005977 A1 | 1/2010 | Menashes |
| 2010/0301808 A1 | 12/2010 | David |
| 2011/0024537 A1 | 2/2011 | Gonzalez |
| 2011/0248108 A1 | 10/2011 | Carriere |
| 2012/0080549 A1 | 4/2012 | Rukavina |
| 2012/0167781 A1 | 7/2012 | Lane |
| 2012/0228952 A1 | 9/2012 | Hall |
| 2012/0242159 A1 | 9/2012 | Lou |
| 2013/0010568 A1 | 1/2013 | Bodum |
| 2013/0222991 A1 | 8/2013 | Mcwilliams |

(56) References Cited

U.S. PATENT DOCUMENTS

| | | | |
|---|---|---|---|
| 2014/0151479 A1 | 6/2014 | Wu | |
| 2014/0247686 A1 | 9/2014 | Arnett | |
| 2014/0301155 A1 | 10/2014 | Montgomery | |
| 2015/0023130 A1 | 1/2015 | Foxlee | |
| 2015/0117137 A1 | 4/2015 | Haney | |
| 2015/0165402 A1 | 6/2015 | King | |
| 2015/0282673 A1 | 10/2015 | Harvey | |
| 2015/0283037 A1 | 10/2015 | Trejo | |
| 2015/0305567 A1 | 10/2015 | Koetz | |
| 2015/0374175 A1 | 12/2015 | Garr | |
| 2016/0114935 A1 | 4/2016 | Rönnholm | |
| 2016/0235243 A1 | 8/2016 | Grassia | |
| 2016/0296899 A1 | 10/2016 | Hoare | |
| 2016/0354740 A1 | 12/2016 | Gonzalez | |
| 2017/0065944 A1 | 3/2017 | Cheung | |
| 2017/0104297 A1 | 4/2017 | Scott | |
| 2017/0105558 A1 | 4/2017 | Andreas | |
| 2017/0110898 A1 | 4/2017 | Kyriakoulis | |
| 2017/0119212 A1 | 5/2017 | Petrillo | |
| 2017/0225937 A1 | 8/2017 | Gallagher | |
| 2018/0009576 A1 | 1/2018 | Sullivan | |
| 2018/0028991 A1 | 2/2018 | Brotzki | |
| 2018/0054142 A1 | 2/2018 | Williams | |
| 2018/0146826 A1 | 5/2018 | Mizrahi | |
| 2018/0160855 A1 | 6/2018 | Krivos | |
| 2018/0221836 A1 | 8/2018 | Ni | |
| 2018/0229243 A1 | 8/2018 | Nocine | |
| 2019/0000275 A1 | 1/2019 | Sapire | |
| 2019/0082893 A1 | 3/2019 | Faulkner-Edwards | |
| 2019/0150669 A1 | 5/2019 | Fan | |
| 2019/0191962 A1 | 6/2019 | Pieterman | |
| 2019/0307287 A1 | 10/2019 | Magatti | |
| 2019/0363567 A1 | 11/2019 | Kim | |
| 2019/0365156 A1 | 12/2019 | Vu | |
| 2020/0061557 A1 | 2/2020 | Bertsch | |
| 2020/0114322 A1 | 4/2020 | Bertsch | |
| 2020/0135391 A1 | 4/2020 | Kwon | |
| 2020/0205615 A1 | 7/2020 | Pamplin | |
| 2020/0223603 A1 | 7/2020 | Ames | |
| 2020/0287421 A1* | 9/2020 | Egenter | A47J 43/0465 |
| 2020/0345181 A1 | 11/2020 | Potaki | |
| 2020/0359842 A1 | 11/2020 | Koh | |
| 2020/0390286 A1 | 12/2020 | Pamplin | |
| 2021/0121840 A1 | 4/2021 | Pamplin | |
| 2021/0154632 A1 | 5/2021 | Pamplin | |
| 2021/0354100 A1 | 11/2021 | Sapire | |
| 2022/0107691 A1 | 4/2022 | Pamplin | |
| 2022/0175192 A1 | 6/2022 | Ahn | |
| 2022/0233024 A1 | 7/2022 | Lee | |
| 2022/0285984 A1 | 9/2022 | Pamplin | |
| 2022/0360101 A1* | 11/2022 | Psarologos | A47J 27/2105 |
| 2023/0043263 A1 | 2/2023 | Varnavides | |
| 2023/0165407 A1 | 6/2023 | O'Donoghue | |
| 2023/0244323 A1 | 8/2023 | Michael | |
| 2023/0391512 A1 | 12/2023 | Sullivan | |
| 2025/0125659 A1 | 4/2025 | Pamplin | |

FOREIGN PATENT DOCUMENTS

| | | | |
|---|---|---|---|
| CN | 101258964 B | 7/2011 | |
| CN | 102949118 A | 3/2013 | |
| CN | 103841867 A | 6/2014 | |
| CN | 104084076 A | 10/2014 | |
| CN | 104385455 A | 3/2015 | |
| CN | 104473576 A | 4/2015 | |
| CN | 104808545 A | 7/2015 | |
| CN | 204467878 U | 7/2015 | |
| CN | 204520400 | 8/2015 | |
| CN | 205006717 U | 2/2016 | |
| CN | 105615698 A | 6/2016 | |
| CN | 205493613 | 8/2016 | |
| CN | 304469273 | 1/2018 | |
| CN | 207194642 U | 4/2018 | |
| CN | 207444802 U | 6/2018 | |
| CN | 207768224 U | 8/2018 | |
| CN | 304785260 S | 8/2018 | |
| CN | 107080417 B | 10/2018 | |
| CN | 108937638 | 12/2018 | |
| CN | 209147461 U | 7/2019 | |
| CN | 110267573 A | 9/2019 | |
| CN | 209437073 U | 9/2019 | |
| CN | 110613300 A | 12/2019 | |
| CN | 210354282 | 4/2020 | |
| CN | 306889374 | 10/2021 | |
| CN | 308283199 | 10/2023 | |
| EP | 2220980 | 8/2010 | |
| EP | 3202293 A1 | 8/2017 | |
| EP | 008330419 | 1/2021 | |
| FR | 2899085 A1 | 10/2007 | |
| GB | 2134804 A | 8/1984 | |
| GB | 2506926 | 4/2014 | |
| GB | 6021494 | 11/2017 | |
| GB | 6294780 | 7/2023 | |
| IN | 384620001 | 12/2023 | |
| JP | H06178734 | 6/1994 | |
| JP | H08-322745 | 12/1996 | |
| JP | 2016514980 | 5/2016 | |
| JP | D1559194 | 9/2016 | |
| JP | 2016531723 | 10/2016 | |
| JP | D1669689 | 10/2020 | |
| JP | D1708864 | 3/2022 | |
| KR | 3009173440000 | 8/2017 | |
| WO | WO-2007020142 A1 * | 2/2007 | A47J 43/0705 |
| WO | 2008047106 | 4/2008 | |
| WO | 2017157965 | 9/2017 | |
| WO | 2020191437 | 10/2020 | |

OTHER PUBLICATIONS

Vitamix A3300 Ascent Series Smart Blender. Date First Available on Amazon.com Jan. 17, 2017. https://www.amazon.com/ Vitamix-Blender-Professional-Grade-Low-Profile-Container/dp/B01N11XJQ6/ref(Year: 2017).

Youtube Orbiter Drinking Lid, posted May 6, 2023 [online], [retrieved Dec. 14, 2023]. Retrieved from internet, https://www.youtube.com/watch?v=wDO20Ldw5VM (Year: 2023).

Video "O'Healthy Portable & Wireless USB Electric Juicer Blender" uploaded Sep. 10, 2018 by user KimstoreTV. 3 pages. Retreived from Internet <https://www.youtube.com/watch?v=vQL3pPAILWE.

Video "TravelBlend Portable Blender with Charging Adapter" uploaded Jun. 12, 2017 by user HSNtv, 11 pages. Retreived from Internet <https ://www.youtube.com/watch?v=zSYv-8_59Y0>.

Video and machine-generated transcript "USB Rechargeable Portable Electric Juice Blender-Extsud" uploaded Aug. 10, 2016 by user Product Peeks. 9 pages. Retreived from Internet <https://www.youtube.com/watch?v=qyYZpDHNGMQ>.

Video of KKSTAR Electric Juice Cup uploaded Mar. 4, 2017 by user bigclivedotcom, 4 pages. Retreived from Internet <https://www.youtube.com/watch?v=FWw9XZ7QDBQ>.

Devan Portable Blender Smoothies Personal Blender. Date First Available on Amazon.com Feb. 10, 2020. https://www.amazon.com/Portable-Blender-Smoothies-Personal-Rechargeable/dp/B084P3FJKL/ref(Year: 2020) 1 page.

ECPURCHASE Portable Blender USB Rechargeable. Date First Available on Amazon.com May 7, 2018. https://www.amazon.com/Portable-Blender-Rechargeable-Single-Personal/dp/B07CXM3CC3/. (Year: 2018) (1 page).

Luwsldirr Electric Blender, posted at Amazon.com on Nov. 23, 2019, 2 pages, [site visited Jul. 27, 2022]. Available from internet, URL: <https:// www.amazon.com/dp/B081WD4QXC/> (Year: 2019).

Mialoe Portable Juicer Blender, posted at Amazon.com on Oct. 12, 2017, 2 pages, [site visited Jul. 27, 2022]. Available from internet, URL: < (https://www.amazon.com/Portable-Updated-Rechargeable-Magnetic-Electric/dp/B076DFV3KT?th=1> (Year: 2017).

OYeet Personal Blender. Date First Available on Amazon.com Jun. 12, 2020. https://www.amazon.com/dp/B088TH5P5M/ref (Year: 2020) 1 page.

PCT International Search Report and Written Opinion, Application No. PCT PCT/US2020/054471, mailed Jan. 5, 2021 (8 pages.).

(56) References Cited

OTHER PUBLICATIONS

PCT International Search Report and Written Opinion, Application No. PCT/US19/63089, dated Feb. 19, 2020, dated 11 pages.
PCT International Search Report and Written Opinion, Application No. PCT/US2022/018497, mailed Jun. 16, 2022, 10 pages.
PCT International Search Report, International Application No. PCT/US2020/054447, mailed Oct. 29, 2020, 7 pages.
PopBabies Portable Blender. Date First Available on Amazon.com Feb. 15, 2019. https://www.amazon.com/dp/B07NSSCCLY/ ref (Year: 2019) 1 page.
Portable Blender Juicer. Date First Available on Amazon.com Apr. 25, 2021. https://www.amazon.com/ Portable-Rechargeable-Smoothies-Handheld-Outdoors/dp/B093FV5RQY/ref (Year: 2021) 1 page.
The Beautiful Existence: BlendJet Portable blender review; https://thebeautifulexistence.com/blendjet-portable-blender-review/ accessed Mar. 28, 2023; Oct. 26, 2018 (11 pages).
Urban Noon Electric Salt and Pepper Grinder. Date First Available on Amazon.com Nov. 15, 2019. https://www.amazon.com/dp/B07WJ6RYQ4/ref (Year: 2019) 1 page.
YouTube.com, BlendJet, Jen Selter's BlendJet Green Smoothie Recipe, Mar. 25, 2019, [site visited Nov. 4, 2021], Available on theInternet URL https://www.youtube.com/shorts/NIFC2ek3Qms (Year: 2019) 1 page.
Blendjet 2 Accessory XL Jar, posted date unknown [online], [retrieved Dec. 14, 2023]. Retrieved from internet, https://rawandtonic.com/product/blendjet-2-accessory-xl-jar/. 4 pages.
Blendjet XL Jar, posted date unknown [online], [retrieved Dec. 14, 2023]. Retrieved from internet, https://blendjet.com/products/xl-jar?variant=39753280028738. 11 pages.
Facebook Post, posted Jul. 1, 2022 [online], [retrieved Dec. 14, 2023]. Retrieved from internet, https://www.facebook.com/blendjet/posts/1402233700264579 (Year: 2022) 1 page.
Today Article, posted Sep. 13, 2022 [online], [retrieved Dec. 14, 2023]. Retrieved from internet, https://today.com/shop/blendjet-2-portable-blender-review-t261869 (Year: 2022) 6 pages.
Bae, J.-N., Lukman, G.F., Ahn, J.-W. and Lee, D.-H. (2020). Variable speed reference control of a high-speed BLDC motor for a blender machine. IET Electr. Power Appl., 14, pp. 2154-2162. <https://doi.org/10.1049/iet-epa.2020.0078> (Year: 2020).
Blending Jar, Cuisinart. Date First Available, Oct. 26, 2015 [online], [site visited Jun. 26, 2024]. Available from URL: <https://www.amazon.com/Cuisinart-CPB-300JAR-Blending-Jar-32oz/dp/B0176UXAMQ/>(Year: 2015).
Costa-Felix, P.B. (2016). Measurement Precision Under Repeatability Conditions of a Batch of Sound Power Assessment for Blenders in Reverberation Room. Archives of Acoustics, 41(3), pp. 591-597 (2016). (Year: 2016).
Extra Large Portable Blender Cup, Blendjet. Date First Available, Aug. 23, 2022 [online], [site visited Jun. 26, 2024]. Available from URL: <https://www.walmart.com/ip/BlendJet-XL-Jar-Extra-Large-Portable-Blender-Cup-32-oz-Clear/5062469452> (Year: 2022).
Glass Water Bottle, SipZest. Date First Available, Oct. 12, 2022 [online], [site visited Jun. 24, 2024]. Available from URL: <https://www.amazon.com/dp/B0BHYXC7PG/> (Year: 2022).
Graduated Glass Drinking Cup, Clobeau. Date First Available,May 19, 2023 [online], [site visited Jun. 26, 2024]. Available from URL: <https://www.amazon.com/Graduated-Borosilicate-Measuring-Beginners-Measurements/dp/B0C5R7TSPJ/ >(Year: 2023).
Milosevic, A., Schaufelberger, U. (2005). Active Noise Control. [Diploma Thesis, University of Applied Sciences Rapperswill HSR]. Accessed online from: <https://web.archive.org/web/20120426050529/http://www.medialab.ch/archiv/pdf_studien_diplomarbeiten/ da05/da2005-104_ActiveNoiseControl.pdf>. (Year: 2005).
Portable Blender, Greecho. Date First Available, Oct. 14, 2023 [online], [site visited Jun. 24, 2024]. Available from URL: <https://www.amazon.com/dp/B0CL2KVQLR/ref=sbl_dpx_kitchen-blenders_BOCXPRLGJD_0?th=1> (Year: 2023).
Prasad, M.G., George, S., Saley, C., Winstanley, K.. (2014). An enclosed wrapping for reducing blender noise, Inter-Noise and Noise-Con Congress and Conference Proceedings, NoiseCon14, Fort Lauderdale, Florida, pp. 539-1128, pp. 702-707(6), Institute of Noise Control Engineering. (Year: 2014).
Replacement Blender Cup, savebuy. Date First Available, Oct. 13, 2021 [online], [site visited Jun. 26, 2024] Available from URL: < https://www.amazon.com/Blender-OSTERIZER-GALAXIE-BLENDER-CHOPPER/dp/B09JCKM4L9/ > (Year: 2021).
Replacement Stainless Steel Jar, Blendin. Date First Available, Oct. 19, 2017 [online], [site visited Jun. 27, 2017]. Available from URL: < https://www.amazon.com/Blendin-Replacement-Stainless-Compatible-Osterizer/dp/B076L91NQ8/>(Year: 2017).
Stainless Steel Jar, Wuyan. Date First Available, Jul. 13, 2021 [online], [site visited Jun. 27, 2017]. Available from URL: < https://www.amazon.com/dp/B0999DLWB6/ > (Year: 2021).
Video "Blenderjet Review" uploaded Jul. 2, 2018 by user Thick Chick Fitness. Retreived from the Internet <https://www.youtube.com/watch?v=oSmLaNIZV68>.

\* cited by examiner

POWER BOOST MODE FOR A BLENDER

FIELD OF THE DISCLOSURE

The present disclosure relates to blenders configured to control different blending modes of operation.

BACKGROUND

Blenders are known, typically as consumer-grade home appliances. User interfaces are known, e.g., for home appliances.

SUMMARY

One aspect of the present disclosure relates to a blender configured to blend foodstuffs using different power modes of operation. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. In some implementations, lack of an external power source, much less a reliable external power source, is no longer preventing users from enjoying blended drinks and/or other foodstuffs. By virtue of the control interface and corresponding control circuitry described in this disclosure, different power modes of operation may be available to the user.

The blender may include a blending component, a base assembly, a container assembly, a control interface, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients. The blending component may be configured to rotate around a rotational axis and blend the foodstuffs during blending by the blender. The base assembly may include an electrical motor, a rechargeable battery, one or more charging interfaces, and/or other components. The electrical motor may be configured to drive rotation of the blending component. The rechargeable battery may be configured to power the electrical motor. The one or more charging interfaces may be configured to conduct electrical power to one or both of the rechargeable battery and the electrical motor. In some implementations, the container assembly may be configured to hold the foodstuffs within a container body during blending by the blender. In some implementations, the control interface may be configured to control operation of the blender upon usage of the control interface by a user.

In some implementations, the control circuitry may be configured to make a first type of detections regarding the usage of the control interface by the user. In some implementations, the control circuitry may be configured to make a second type of detections regarding availability of power from the rechargeable battery. In some implementations, the control circuitry may be configured to make a third type of detections regarding usage of the one or more charging interfaces to conduct the electrical power to one or both of the rechargeable battery and the electrical motor. In some implementations, the control circuitry may be configured to control, based on one or more detections of the first, second, and third type of detections, the electrical motor during the rotation of the blending component using at least two different power modes of operation, including a first power mode of operation and a second power mode of operation. During the first power mode of operation, a first amount of electrical power may be provided by the rechargeable battery to the electrical motor such that the blending component is configured to rotate at a first rotational speed. The first rotational speed may be limited in the first power mode of operation by a first rotational speed. In some implementations, in the first power mode of operation, the electrical motor may be powered only by the rechargeable battery. During the second power mode of operation, a second amount of electrical power may be provided to the electrical motor. The second amount of electrical power may be provided conjointly by the rechargeable battery and through at least one of the one or more charging interfaces such that the blending component is configured to rotate at a second rotational speed. The second rotational speed may be limited in the second power mode of operation by a second rotational speed limit. The second amount of electrical power may be greater than the first amount of electrical power (or, in other words, boosted). The second rotational speed limit may be greater than the first rotational speed limit.

Another aspect of the present disclosure relates to a method for controlling operation of a blender to blend foodstuffs using different power modes of operation. In some implementations, the method may include making a first type of detections regarding usage of a control interface by a user. The method may include making a second type of detections regarding availability of power from a rechargeable battery. The method may include making a third type of detections regarding usage of one or more charging interfaces to conduct electrical power to one or both of the rechargeable battery and an electrical motor. The method may include controlling, based on one or more detections of the first, second, and third type of detections, the electrical motor during rotation of a blending component using at least two different power modes of operation, including a first power mode of operation and a second power mode of operation.

In some implementations, during the first power mode of operation, a first amount of electrical power may be provided by the rechargeable battery to the electrical motor such that the blending component is configured to rotate at a first rotational speed. The first rotational speed may be limited in the first power mode of operation by a first rotational speed limit. In the first power mode of operation, the electrical motor may be powered only by the rechargeable battery. In some implementations, during the second power mode of operation, a second amount of electrical power is provided to the electrical motor. The second amount of electrical power may be provided conjointly by the rechargeable battery and through at least one of the one or more charging interfaces such that the blending component is configured to rotate at a second rotational speed. The second rotational speed may be limited in the second power mode of operation by a second rotational speed limit. The second amount of electrical power may be greater than the first amount of electrical power. The second rotational speed limit may be greater than the first rotational speed limit.

As used herein, any association (or relation, or reflection, or indication, or correspondency) involving assemblies, blending components, blades, motors, rotational axes, longitudinal axes, diameters, batteries, couplings, interfaces, buttons, detectors, detections, indicators, magnetic components, rotations, rotational speeds, speed limits, modes of operation, amounts of electrical power, couplings, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
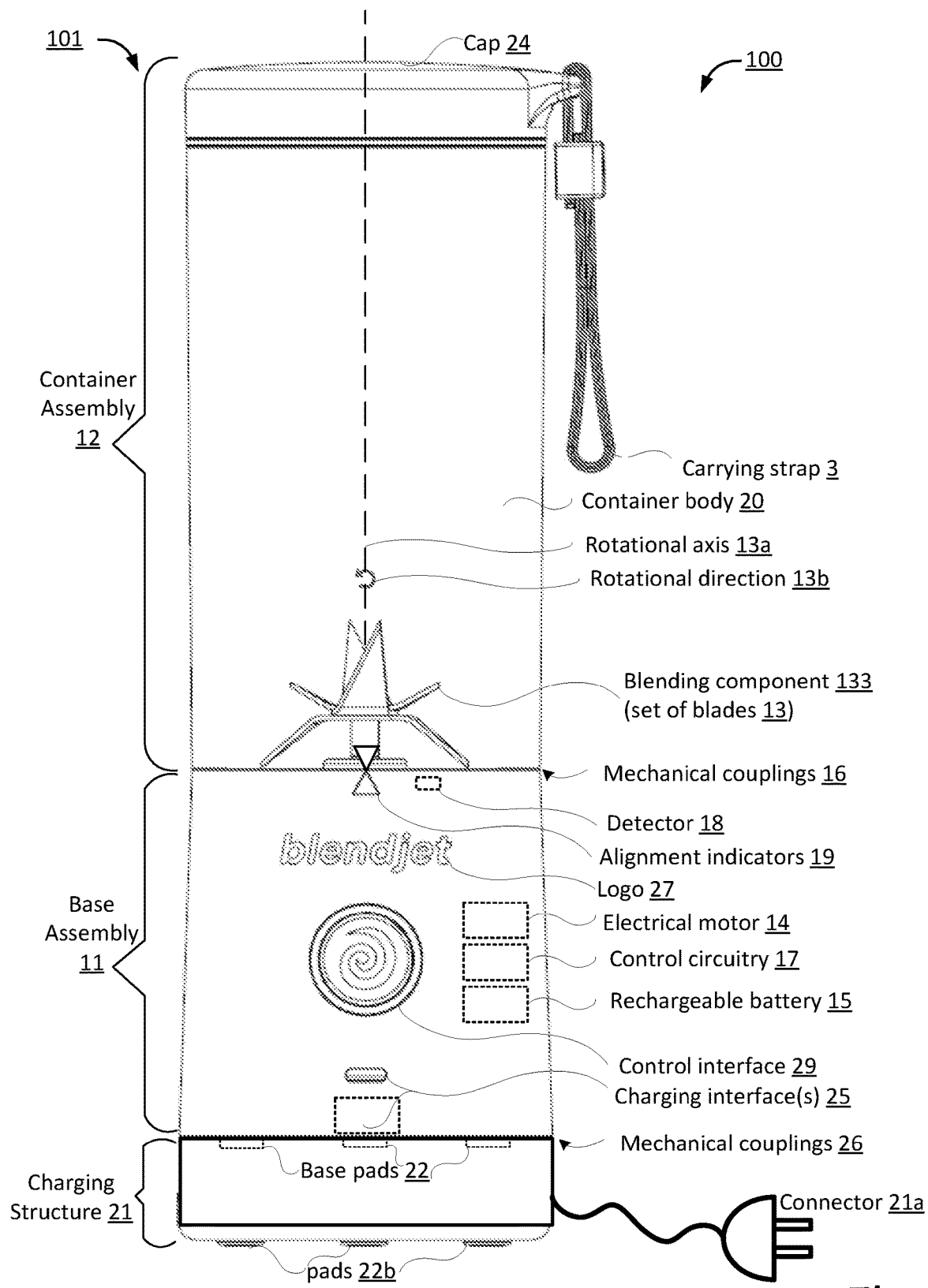
FIG. 1 shows a front view of a charging structure and a blender configured to blend foodstuffs using different power modes of operation, in accordance with one or more implementations.

FIG. 1 shows a blender 100 configured to blend foodstuffs using different power modes of operation, in accordance with one or more implementations. FIG. 1 furthermore shows a combination 101 of blender 100 and a charging structure 21. Combination 101 may also be referred to as a blending system 101.

Blender 100 may include one or more of a base assembly 11, a container assembly 12, a blending component 133, a control interface 29, control circuitry 17 (depicted in FIG. 1 as a dotted rectangle to indicate this component may be embedded within base assembly 11, and not readily visible from the outside), and/or other components. Charging structure 21 may be configured to support charging of blender 100. In some implementations, charging structure 21 may be powered through an external power source (not depicted) that is external to blender 100, e.g., through a connector 21a. In some implementations, connector 21a may be configured to plug into a socket and/or power supply. In some implementations, blender 100 may be configured to support different and/or simultaneous types of charging.

Base assembly 11 and container assembly 12 may be configured to be coupled during blending by blender 100. For example, in some implementations, base assembly 11 and container assembly 12 may be mechanically coupled, e.g., through one or more mechanical couplings 16, which may be threaded. Other types of couplings may be envisioned for blender 100, though leak-proof options are preferred, since blender usage commonly includes one or more liquid ingredients. In some implementations, control circuitry 17 and/or other components may be included in base assembly 11, e.g., within base assembly 11. For example, one or more of control interface 29, control circuitry 17, electrical motor 14 (depicted in FIG. 1 as a dotted rectangle to indicate this component may be embedded within base assembly 11, and not readily visible from the outside), rechargeable battery 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase "integrated permanently" may refer to components being integrated such that they are not readily accessible, serviceable, and/or replaceable by a user, or at least not during ordinary usage by the user, including, but not limited to, charging, blending, cleaning, and storing for later use.

In some implementations, base assembly 11 may include one or more of a base body (e.g., a housing configured to contain the components of base assembly 11), blending component 133 (e.g., a set of blades 13, also referred to as a set of one or more blades 13), electrical motor 14, a rechargeable battery 15, one or more charging interfaces 25 (a first charging interface is depicted in FIG. 1 as a charging port visible on the outside of blender 100, and a second charging interface is depicted in FIG. 1 as a dotted rectangle to indicate this component may be embedded within base assembly 11, and not readily visible from the outside), one or more mechanical couplings 16, a detector 18 (depicted in FIG. 1 as a dotted rectangle to indicate this component may be embedded within base assembly 11, and not readily visible from the outside), one or more alignment indicators 19, control interface 29 (depicted in FIG. 1 as being marked with a swirl symbol), and/or other components.

In some implementations, one or more mechanical couplings 16 may include threaded couplings. For example, one or more mechanical couplings 16 may include a first mechanical coupling and a second mechanical coupling. In some implementations, the first mechanical coupling may be included in base assembly 11, and may be a female threaded coupling configured to fit together with the second mechanical coupling (which may be included in container assembly 12). Other implementations are envisioned within the scope of this disclosure. The first mechanical coupling and the second mechanical coupling may be configured to (temporarily and detachably) couple base assembly 11 to container assemble 12.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric two-dimensional line extending indefinitely through blending component 133, and is not a physical axis. Rather, rotational axis 13a indicates how blending component 133 rotates in relation to other components of blender 100, e.g., in a rotational direction 13b. In some implementations, blending component 133 may be mounted permanently to base assembly 11. In some implementations, set of blades 13 may include one, two, three, four, five, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form three pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations using a limited amount of power (here, the term limited is used in comparison to non-portable counter-top blenders that are permanently connected to common outlets during blending), such as disclosed herein. As used herein, directional terms such as upward, downward, left, right, front, back, and so forth are relative to FIG. 1 unless otherwise noted.

Referring to FIG. 1, in some implementations, base assembly 11 may have a cylindrical and/or conical shape (apart from blending component 133 and/or set of blades 13). In some implementations, the shape of base assembly 11 may have a base diameter between 2 and 4 inches. In some implementations, the shape of base assembly 11 may have a base diameter between 3 and 3.5 inches. Such a base diameter may improve portability, as well as allow blender 100 to be stored in a cup holder, e.g., in a vehicle. In some implementations, base assembly may include base pads 22 at the bottom, e.g., for improved stability in an upright position. In some implementations, base pads 22 may couple and/or connect with charging structure 21. In some implementations, base assembly 11 and charging structure 21 may be mechanically coupled, e.g., through one or more mechanical couplings 26, which may be threaded. In some implementations, one or more mechanical couplings 26 may include threaded couplings. For example, one or more mechanical couplings 26 may include a first mechanical base coupling and a second mechanical base coupling. In some implementations, the first mechanical base coupling may be included in base assembly 11, and may be a female threaded coupling configured to fit together with the second mechanical base coupling (which may be included in charging structure 21). Other implementations are envisioned within the scope of this disclosure. The first mechanical base coupling and the second mechanical base coupling may be configured to (temporarily and detachably) couple base assembly 11 to charging structure 21. In some implementations, charging structure 21 may include pads 22b at the bottom, e.g., for improved stability in an upright position.

Figure 5A:
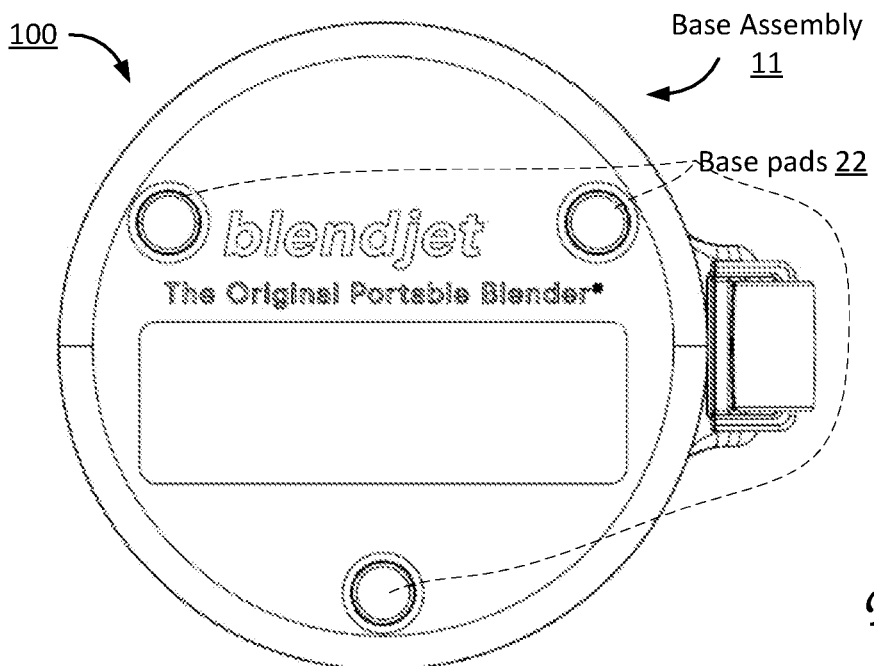
FIGS. 5A-5B show a bottom view of a base assembly of a blender configured to blend foodstuffs using different power modes of operation, in accordance with one or more implementations.
Figure 5B:
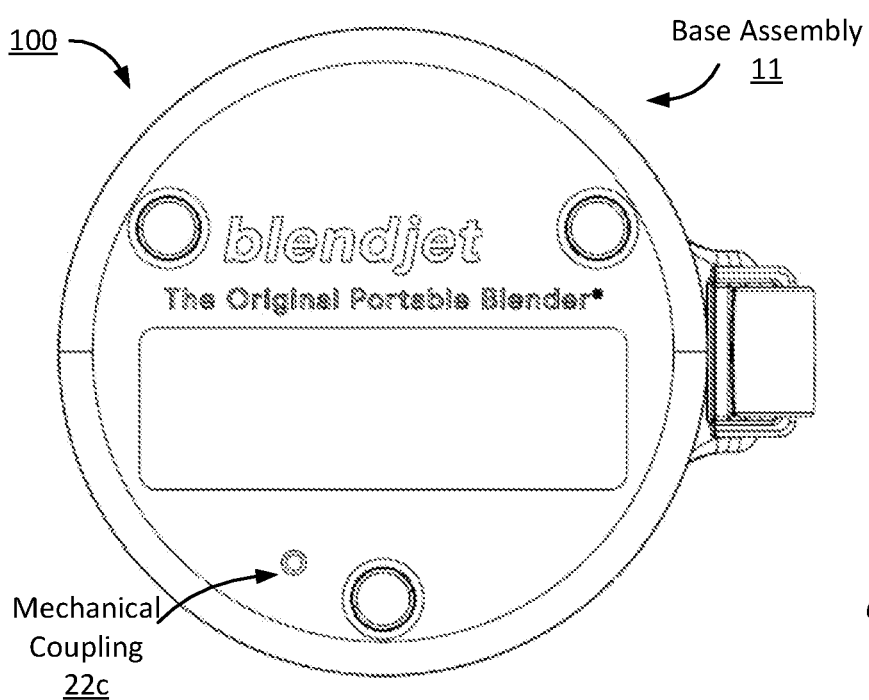

By way of non-limiting example, FIG. 5A shows a bottom view of base assembly 11, including base pads 22. In some implementations, base pads 22 may be shaped to provide a mechanical coupling with charging structure 21 (see FIG. 1). In some implementations, a mechanical coupling between base assembly 11 and charging structure 21 may provide improved stability during blending. In some implementations, base pads 22 may include magnetic elements. By way of non-limiting example, FIG. 5B shows a bottom view of base assembly 11, including a mechanical coupling 22c. In some implementations, mechanical coupling 22c may be configured to provide a mechanical coupling between base assembly 11 and charging structure 21. In some implementations, mechanical coupling 22c may provide improved stability during blending. In some implementations, mechanical coupling 22c may include magnetic elements.

Figure 4:
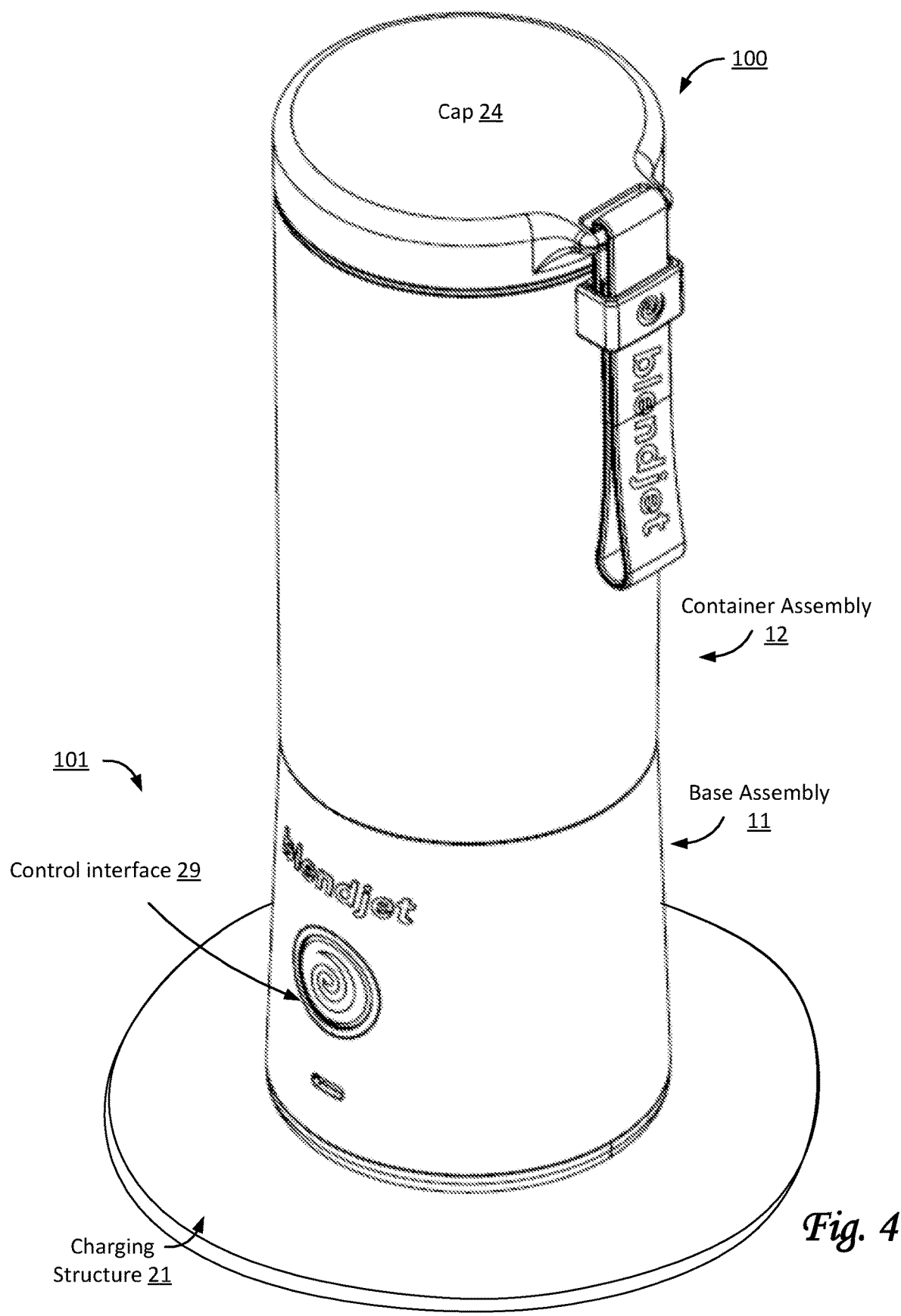
FIG. 4 shows an isometric elevated view of a charging structure and a blender configured to blend foodstuffs using different power modes of operation, in accordance with one or more implementations.

Referring to FIG. 1, container assembly 12 may include one or more of a container body 20, a cap 24 (e.g., to prevent spilling during blending), a carrying strap 3 (e.g., configured to carry blender 100), and/or other components. Container body 20 may form a vessel to hold and/or contain foodstuffs within container assembly 12. In some implementations, container assembly 12 and/or container body 20 may be a cylindrical body and/or have a cylindrical shape, as depicted in FIG. 4. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces.

Referring to FIG. 1, electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to operate at multiple different voltages, depending on the power supplied to electrical motor 14. For example, during a first mode of operation, electrical motor 14 may operate at a first voltage, during a second mode of operation, electrical motor 14 may operate at a second voltage that is higher than the first voltage, and so forth. In some implementations, electrical motor 14 may be a universal motor. In some implementations, electrical motor 14 may have a variable-frequency drive. In some implementations, electrical motor 14 may be a brushed DC electric motor.

In some implementations, electrical motor 14 may be configured to rotate blending component 133 at a particular rotational speed. In some implementations, the rotational speed may be limited by a particular rotational speed limit. In some implementations, the particular rotational speed and/or the particular rotational speed limit may be controlled, e.g., by control circuitry 17, such that different power modes of operation correspond to different rotational speeds and/or rotational speed limits. For example, during a first power mode of operation, electrical motor 14 may be configured to rotate using a first rotational speed and/or limited by a first rotational speed limit. For example, during a second power mode of operation, electrical motor 14 may be configured to rotate using a second rotational speed and/or limited by a second rotational speed limit. For example, during a third power mode of operation, electrical motor 14 may be configured to rotate using a third rotational speed and/or limited by a third rotational speed limit, and so forth. In some implementations, control circuit 17 may be configured to control electrical motor 14 during rotation of blending component 133. For example, control circuit 17 may control the speed of the rotation of blending component 133 during blending by blender 100.

In some implementations, blender 100's maximum rotational speed may range between 15,000 rotations per minute (RPM) and 40,000 RPM. In some implementations, blender 100's maximum rotational speed may range between 10,000 rotations per minute (RPM) and 50,000 RPM. In one or more implementations, electrical motor 14 may rotate blending component 133 at a rotational speed of about 16,500 RPM (e.g., during a first power mode of operation). In one or more implementations, electrical motor 14 may rotate blending component 133 at a rotational speed ranging between about 20,000 RPM and about 25,000 RPM (e.g., during a second and/or third power mode of operation). In one or more implementations, electrical motor 14 may rotate blending component 133 at a rotational speed ranging between about 30,000 RPM and about 33,000 RPM (e.g., during a second and/or third power mode of operation).

Electrical motor 14 may be configured to be powered by rechargeable battery 15. Alternatively, and/or simultaneously, in some implementations, electrical motor 14 may be configured to be powered through one or more charging interfaces 25. One or more charging interfaces 25 may be configured to conduct electrical power to one or both of rechargeable battery 15 and electrical motor 14.

Referring to FIG. 1, rechargeable battery 15 may be configured to power electrical motor 14. In some implementations, and in some modes of operation, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable (in other words, non-removable). In some implementations, rechargeable battery 15 may be user-replaceable. In some implementations, rechargeable battery 15 may be store-bought. In some implementations, rechargeable battery 15 may have a capacity between 1000 mAh and 10000 mAh. In some implementations, control circuit 17 may be configured to control charging of rechargeable battery 15. For example, control circuit 17 may control the transfer of electrical power through one or more charging interfaces 25 into rechargeable battery 15. For example, responsive to a detection that rechargeable battery 15 is fully charged, control circuit 17 may prevent the transfer of electrical power through charging interface 25 into rechargeable battery 15.

In some implementations, one or more charging interfaces 25 may be standardized. In some implementations, one or more charging interfaces 25 may be configured to conduct electrical power to rechargeable battery 15. In some implementations, one or more charging interfaces 25 may be configured to conduct electrical power to charge rechargeable battery 15, e.g., from an external power source. Alternatively, and/or simultaneously, in some implementations, one or more charging interfaces 25 may be configured to conduct electrical power to electrical motor 14.

In some implementations, one or more charging interfaces 25 may be configured to support wireless charging of rechargeable battery 15, e.g., from an external power source, including but not limited to (electromagnetic) induction-based charging. For example, in some implementations, one or more charging interfaces 25 may include a wireless charging interface that includes a coil. For example, the wireless charging interface in base assembly 11 may include a secondary coil, and charging structure 21 may include a primary coil, such that the primary and secondary coils support inductive charging and/or inductive conducting of electrical power into blender 100 (through inductive coupling between the primary and secondary coils). In some implementations, charging structure 21 and blender 100 may be configured to support charging through resonant inductive coupling. Charging structure 21 may be configured to charge blender 100. In some implementations, charging structure 100 may be configured to support wireless charging, such as, e.g., inductive charging. Alternatively, and/or simultaneously, in some implementations, charging structure 100 may be configured to support charging through direct electrical contact. In some implementations, charging structure 21 may be a dock or docking pad, e.g., as depicted in FIG. 1. In some implementations, charging structure 21 may be a charging mat or charging pad, as depicted in FIG. 4. By way of non-limiting example, FIG. 4 shows an isometric elevated view of combination 101 of charging structure 21 and blender 100 (including base assembly 11, control interface 29, container assembly 12, cap 24, and other components).

Referring to FIG. 1, in some implementations, one or more charging interfaces 25 may include a universal serial bus (USB) port configured to receive an electrical connector, e.g., for charging rechargeable battery 15. The electrical connector, if used, may be connected to an external power source. A USB port is merely one type of standardized charging interface. Other standards are contemplated within the scope of this disclosure. In some implementations, one or more charging interfaces 25 may support (at least part of) the Qi wireless charging standard. In some implementations, one or more charging interfaces 25 may support (at least part of) one or more wireless charging standards widely adopted in the industry. In some implementations, one or more charging interfaces 25 may be covered for protection and/or other reasons.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

In some implementations, detector 18 may be configured to detect whether mechanical couplings 26 are coupled in a manner operable and suitable for providing electrical power to blender 100 and blending by blender 100. In some implementations, operation of detector 18 may use one or more magnetic components, similar as described above.

Control interface 29 may be part of the user interface of blender 100. Through the user interface, a user of blender 100 may control the operation of blender 100, including but not limited to transitions between different modes of operation. For example, the different modes of operation may include multiple (power) modes of operation. For example, in some implementations, the modes of operation include a ready-to-blend mode. During the ready-to-blend mode, blender 100 is not blending, but blender 100 may be ready to blend. For example, blender 100 may have sufficient power through rechargeable battery 15, and mechanical couplings 16 may be coupled in a manner operable and suitable for blending by blender 100. The transitions may include transitions from the ready-to-blend mode to other modes of operation, and/or vice versa.

In some implementations, the power modes of operation of blender 100 may include at least two power modes of operation: a first power mode of operation, a second power mode of operation, and/or other power modes of operation. For example, during various modes of operation of blender 100, control circuitry 17 may be configured to effectuate rotation of blending component 133 (in other words, to effectuate blending), e.g., for a particular duration. In some implementations, blender 100 may use a third and/or fourth power mode of operation. In some implementations, any power mode of operation that uses an additional source of power (i.e., in addition to rechargeable battery 15) may be referred to as a power boost mode, or a power boost mode of operation.

In some implementations, control interface 29 may include one or more buttons. For example, a button of control interface 29 may be configured to be pushed by the user (as used herein, a push may be released quickly or may be held down, or may be followed by one or more additional pushes, e.g. in the case of a double push). In some implementations, control interface 29 includes exactly one button. For example, in some implementations, the button may be the only user-manipulatable portion of control interface 29, such that no other button or user interface component controls the operation of blender 100 or the transitions between different modes of operation used by blender 100. In some implementations, control interface 29 may include one or more controllable light-emitting components. For example, the light-emitting components may be light-emitting diodes (LEDs) or other types of lights. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, and/or other information regarding the operation of blender 100. For example, the one or more controllable light-emitting components may use different colors, intensities, patterns, sequences, and/or other combinations of light to provide information to the user. In some implementations, control interface 29 may include one or more controllable sound-emitting components, such as a speaker, configured to selectively emit sound. In some implementations, the one or more controllable sound-emitting components may be configured to indicate, to a user, a current mode of operation of blender 100, an occurrence of a transition between different modes of operation, a warning for the user, and/or other information regarding the operation of blender 100. For example, the one or more controllable sound-emitting components may use different frequencies, volumes, patterns, sequences, and/or other combinations of sound to provide information to the user. In some implementations, control interface 29 may include one or more haptic components to provide feedback to a user.

Control circuitry 17 may be configured to control different functions and/or operations of blender 100, including but not limited to turning blender 100 on and off, transitioning between different modes of operation, charging of rechargeable battery 15, controlling of electrical motor 14 regarding and/or during rotation of blending component 133, determining whether mechanical couplings 16 are engaged properly for blending, determining whether mechanical couplings 26 are engaged properly for blending, controlling or otherwise using control interface 29, and/or performing other functions for blender 100. In some implementations, control circuitry 17 may be configured to prevent rotation of blending component 133 responsive to certain determinations, including but not limited to a determination that mechanical couplings 16 are not engaged (or not engaged properly for the intended operation of blender 100). In some implementations, control circuitry 17 may be configured to use control interface 29 to convey information regarding the operational status of blender 100 to a user. For example, control interface 29 may include a light that can illuminate in various colors and/or patterns. In some implementations, control circuitry 17 may be implemented as a printed circuit board (PCB).

In some implementations, control circuitry 17 may be configured to make different types of detections regarding blender 100. In some implementations, a first type of detections may be regarding the usage of control interface 29 by the user. For example, control circuitry may detect whether a button of control interface 29 has been pushed by a user, or released, or pushed again. In some implementations, a second type of detections may be regarding availability of power from rechargeable battery 15. In some implementations, a third type of detections may be regarding usage of one or more charging interfaces 25 to conduct electrical power to one or both of rechargeable battery 15 and electrical motor 14. Additional types of detections are envisioned within the scope of this disclosure.

In some implementations, control circuitry 17 may be configured to control electrical motor 14, e.g., during the rotation of blending component 133. In some implementations, control circuitry 17 may be configured to control electrical motor 14 using at least two different power modes of operation, such as a first power mode of operation and a second power mode of operation. Control by control circuitry 17 may be based on one or more detections of the first, second, third, and/or other types. For example, the first power mode of operation may be selected by control circuitry 17 responsive to a combination of a first detection (being of the first type of detections, that a user pushed a button) and a second detection (being of the second type of detections, that rechargeable battery 15 can provide power). In some implementations, the second power mode of operation may be selected by control circuitry 17 responsive to a combination of these first and second detections in addition to a third detection (being of the third type of detections, that at least one of the one or more charging interfaces 25 can provide power). In some implementations, the third detection may mean the user has plugged an active USB connector into the USB port of blender 100, through which additional electrical power may be available to blender 100 in general, and/or to electrical motor 14 in particular. In some implementations, the third detection may mean the user has coupled an active wireless charger to blender 100 (e.g., through charging structure 21), through which additional electrical power may be available to blender 100 in general, and/or to electrical motor 14 in particular. In some implementations, a third power mode of operation may be selected by control circuitry 17 responsive to a combination of first and second detections in addition to a detection that multiple charging interfaces 25 can provide power to blender 100 in general, and/or to electrical motor 14 in particular. Additional power modes of operation are envisioned within the scope of this disclosure.

In some implementations, during a first power mode of operation, a first amount of electrical power may be provided by rechargeable battery 15 to electrical motor 14 such that blending component 133 is controlled and/or configured to rotate at a first rotational speed. The first rotational speed may be limited in the first power mode of operation by a first rotational speed limit. In some implementations, in the first power mode of operation, electrical motor 14 may be powered only by rechargeable battery 15. In some implementations, during a second power mode of operation, a second amount of electrical power may be provided to electrical motor 14. The second amount of electrical power may be provided conjointly by rechargeable battery 15 and through at least one of the charging interfaces 25 such that blending component 133 is controlled and/or configured to rotate at a second rotational speed. As used herein, the term "conjointly" refers to multiple sources of electrical power operating at the same time to provide electrical power, in this case to electrical motor 14 and/or other components of blender 100. In other words, power provided by one source is combined with power provided by another source.

The second rotational speed may be limited in the second power mode of operation by a second rotational speed limit. In some implementations, the second amount of electrical power may be greater than the first amount of electrical power. For example, in some implementations, the second amount of electrical power may be at least 20% greater than the first amount of electrical power. For example, in some implementations, the second amount of electrical power may be at least 30% greater, 40% greater, 50%, and/or 100% greater than the first amount of electrical power. In some implementations, the second rotational speed limit may be greater than the first rotational speed limit. For example, in some implementations, the second rotational speed limit may be at least 20% greater than the first rotational speed limit. For example, in some implementations, the second rotational speed limit may be at least 30% greater, 40% greater, 50%, and/or 100% greater than the first rotational speed limit. Alternatively, and/or simultaneously, in some implementations, the output wattage of electrical motor 14 during the second power mode of operation may be about 20%, about 30%, about 40%, about 50%, and/or about 100% greater than the output wattage during the first power mode of operation. Alternatively, and/or simultaneously, in some implementations, the torque of electrical motor 14 during the second power mode of operation may be about 20%, about 30%, about 40%, about 50%, and/or about 100% greater than the torque during the first power mode of operation.

In some implementations, control circuitry 17 may be configured to control operation of control interface 29 to enable transitions between different modes of operation. The transitions may include a first, second, third, fourth, fifth transition, and so forth. For example, a first transition may be from the ready-to-blend mode to the first power mode of operation. In some implementations, the first transition may occur responsive to an occurrence of the first type of detections (in the ready-to-blend mode). For example, a second transition may be to the second power mode of operation, and so forth. In some implementations, the second transition may occur responsive to an occurrence of the second and/or third types of detections.

In some implementations, control by a user of blender 100 may be based on a switch (not shown), a button, and/or other types of user interfaces suitable to turn consumer appliances on and off. Control interface 29 (e.g., through one or more light-emitting components) may be configured to illuminate in various colors (red, blue, purple, etc.) and/or patterns (solid, fast blinking, slow blinking, alternating red and blue, etc.). Control interface 29 may convey information regarding the operational status of blender 100 to a user. The operational status of blender 100 may be determined by control circuitry 17. Control interface 29 may be controlled by control circuitry 17. For example, if control interface 29 is solid purple, blender 100 may be charging and/or insufficiently charged to blend. For example, if control interface 29 is solid blue, blender 100 may be ready for blending (e.g., in the ready-to-blend mode). For example, if control interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper operation of blender 100, and control interface 29 may warn the user when the threaded couplings are not tightened sufficiently and/or correctly.

Figure 3A:
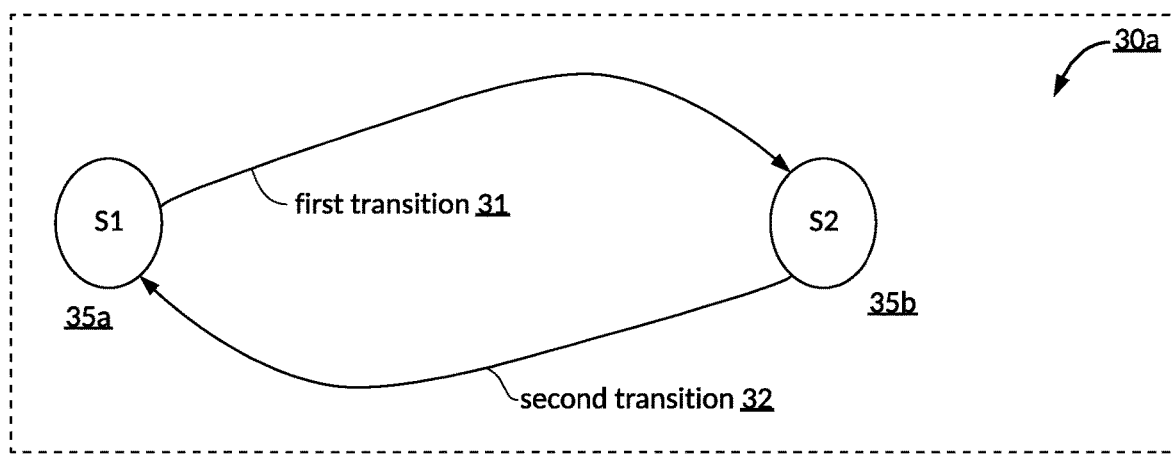
FIGS. 3A-3B-3C-3D-3E-3F-3G illustrate state transitions in state diagrams as may be used by a blender configured to blend foodstuffs using different power modes of operation, in accordance with one or more implementations.

By way of non-limiting example, FIG. 3A illustrates state transitions in a state diagram 30*a* as may be used by blender 100, e.g., responsive to different types of detections as described elsewhere in this disclosure. As depicted, state diagram 30*a* may include a first state (labeled "S1") and a second state 35*b* (labeled "S2"). First state 35*a* may correspond to a ready-to-blend mode of blender 100. Second state 35*b* may correspond to a first power mode of operation of blender 100. As depicted here, a first transition 31 may transition the mode of operation of blender 100 from first state 35*a* to second state 35*b*. A second transition 32 may transition the mode of operation of blender 100 from second state 35*b* to first state 35*a*. First transition 31 may occur, e.g., responsive to detection of the first type of detection. Second transition 32 may occur automatically, e.g., after completion of a blending operation.

Figure 3B:
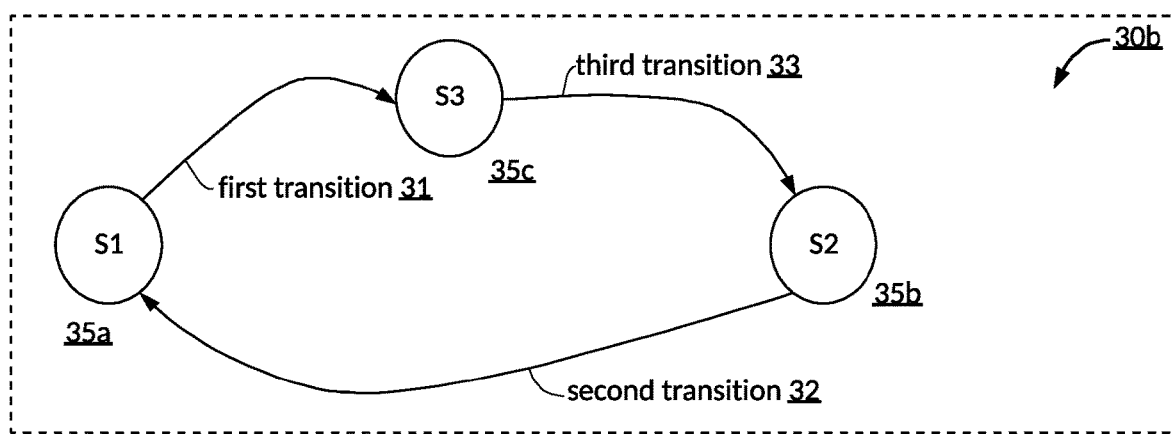

By way of non-limiting example, FIG. 3B illustrates state transitions in a state diagram 30*b* as may be used by blender 100, e.g., responsive to different types of detections as described elsewhere in this disclosure. As depicted, state diagram 30*b* may include a first state (labeled "S1"), a second state 35*b* (labeled "S2"), and a third state 35*c* (labeled "S3"). First state 35*a* may be similar as described regarding FIG. 3A. Second state 35*b* may correspond to a second power mode of operation of blender 100. Third state 35*c* may correspond to the first power mode of operation of blender 100. As depicted in state diagram 30*b*, a first transition 31 may transition the mode of operation of blender 100 from first state 35*a* to third state 35*c*. A second transition 32 may transition the mode of operation of blender 100 from second state to first state 35*a*. A third transition 33 may transition the mode of operation of blender 100 from third state 35*c* to second state 35*b*. First transition 31 may occur responsive to detection of the first type of detection. In some implementations, first transition 31 may occur responsive to detection of both the first type and the second type of detection. Third transition 33 may occur responsive to detection of the third type of detection. Second transition 32 may occur automatically.

Figure 3C:
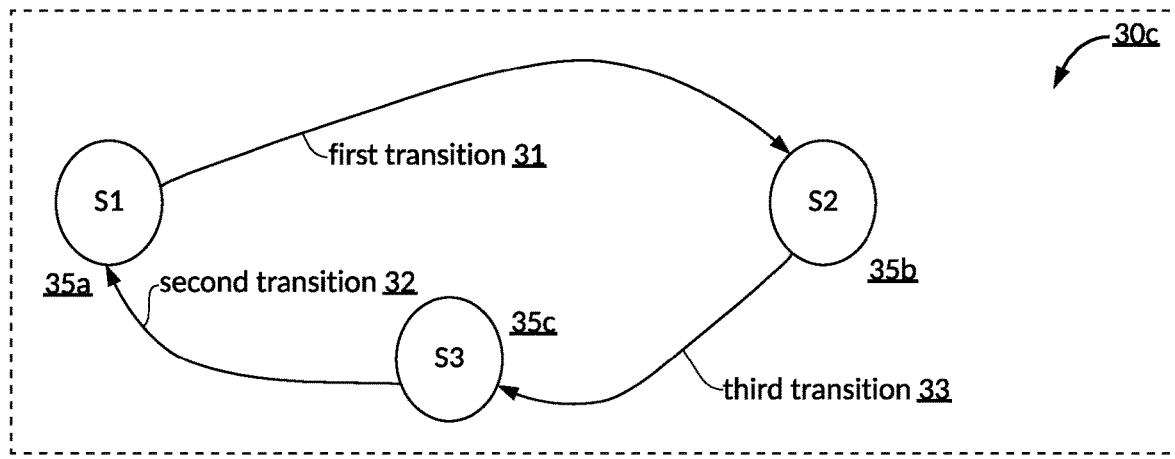

By way of non-limiting example, FIG. 3C illustrates state transitions in a state diagram 30c as may be used by blender 100, e.g., responsive to different types of detections as described elsewhere in this disclosure. As depicted, state diagram 30c may include a first state 35a (labeled "S1"), a second state 35b (labeled "S2"), and a third state 35c (labeled "S3"). First state 35a may be similar as described regarding FIG. 3A. Second state 35b may correspond to the second power mode of operation of blender 100. Third state 35c may correspond to the first power mode of operation of blender 100. As depicted in state diagram 30c, a first transition 31 may transition the mode of operation of blender 100 from first state 35a to second state 35b. A second transition 32 may transition the mode of operation of blender 100 from third state 35c to first state 35a. A third transition 33 may transition the mode of operation of blender 100 from second state 35b to third state 35c. First transition 31 may occur responsive to detection of the first, second, and third types of detection. Third transition 33 may occur responsive to a detection that none of the charging interfaces conduct electrical power. Second transition 32 may occur responsive to detection of a given type of detection (e.g., depletion of the rechargeable battery), and/or automatically after a time-out.

Figure 3D:
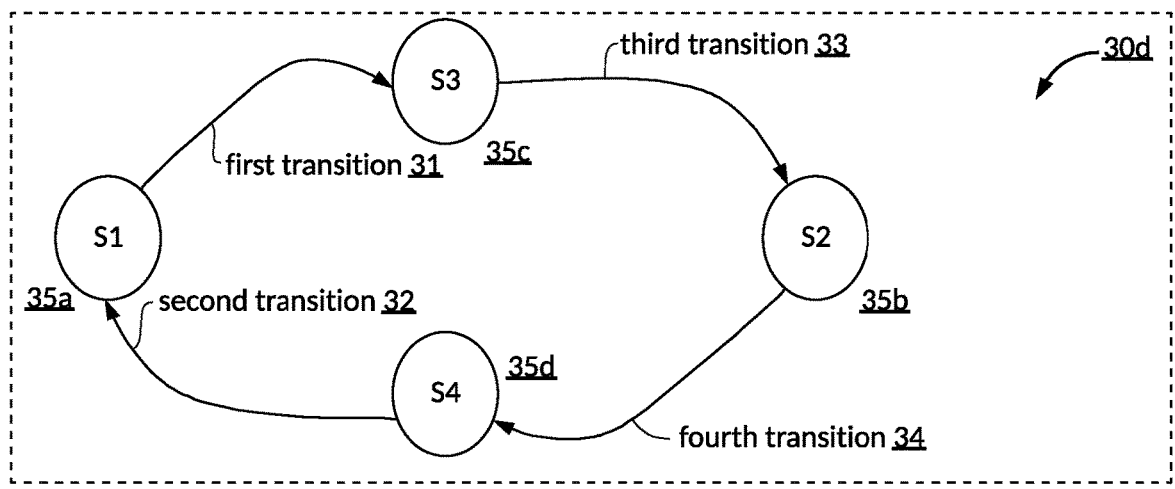

By way of non-limiting example, FIG. 3D illustrates state transitions in a state diagram 30d as may be used by blender 100, e.g., responsive to different types of detections as described elsewhere in this disclosure. As depicted, state diagram 30c may include a first state (labeled "S1"), a second state 35b (labeled "S2"), a third state 35c (labeled "S3"), and a fourth state 35d (labeled "S4"). First state 35a may be similar as described regarding FIG. 3A. Second state 35b may correspond to the second power mode of operation of blender 100. Third state 35c may correspond to the first power mode of operation of blender 100. Fourth state 35d may correspond to a third power mode of operation of blender 100. As depicted in state diagram 30d, a first transition 31 may transition the mode of operation of blender 100 from first state 35a to third state 35c. A second transition 32 may transition the mode of operation of blender 100 from fourth state 35d to first state 35a. A third transition 33 may transition the mode of operation of blender 100 from third state 35c to second state 35b. A fourth transition 34 may transition the mode of operation of blender 100 from second state to fourth state 35d. First transition 31 may occur responsive to detections of the first and second types of detection. Third transition 33 may occur responsive to the additional detection of a third type of detection (e.g., electrical power is available through the USB port in the base assembly). Fourth transition 34 may occur responsive to another additional detection of the third type of detection (e.g., electrical power is available through the charging structure, which may provide a wireless power transfer). Second transition 32 may occur responsive to detection of a given type of detection (e.g., depletion of the rechargeable battery), and/or automatically after a time-out.

Figure 3E:
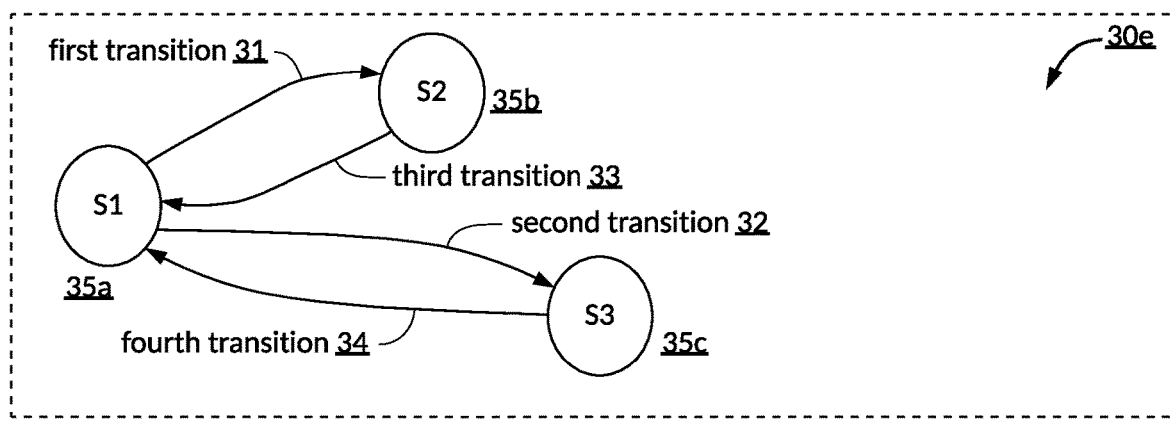

By way of non-limiting example, FIG. 3E illustrates state transitions in a state diagram 30e as may be used by blender 100, e.g., responsive to different types of detections as described elsewhere in this disclosure. As depicted, state diagram 30e may include a first state 35a (labeled "S1"), a second state 35b (labeled "S2"), and a third state 35c (labeled "S3"). First state 35a may correspond to a ready-to-blend mode of blender 100. Second state 35b may correspond to the first power mode of operation of blender 100. Third state 35c may correspond to the second power mode of operation of blender 100. As depicted here, a first transition 31 may transition the mode of operation of blender 100 from first state 35a to second state 35b. A second transition 32 may transition the mode of operation of blender 100 from first state 35a to third state 35c. A third transition 33 may transition the mode of operation of blender 100 from second state 35b to first state 35a. A fourth transition 34 may transition the mode of operation of blender 100 from third state 35c to first state 35a. First transition 31 may occur responsive to detection of a combination of the first and second types of detection. Second transition 32 may occur responsive to detection of a combination of the first, second, and third types detection. Third transition 33 may occur responsive to detection of a given type of detection (e.g., depletion of the rechargeable battery), and/or automatically after a time-out. Fourth transition 34 may occur responsive to detection of a given type of detection (e.g., depletion of the rechargeable battery), and/or automatically after a time-out.

Figure 3F:
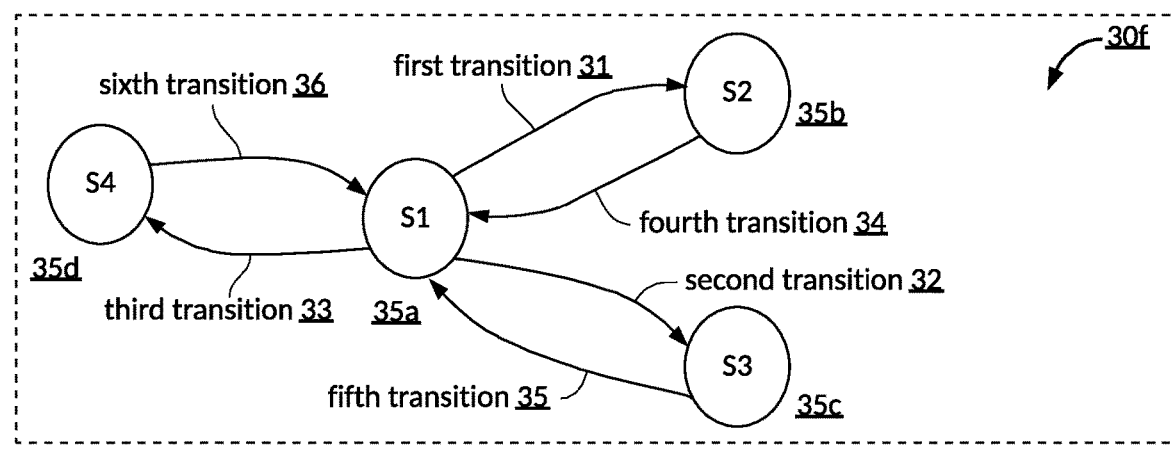

By way of non-limiting example, FIG. 3F illustrates state transitions in a state diagram 30f as may be used by blender 100, e.g., responsive to different types of detections as described elsewhere in this disclosure. As depicted, state diagram 30f may include a first state 35a (labeled "S1"), a second state 35b (labeled "S2"), a third state 35c (labeled "S3"), and a fourth state 35d (labeled "S4"). First state 35a may correspond to a ready-to-blend mode of blender 100. Second state 35b may correspond to the first power mode of operation of blender 100. Third state 35c may correspond to the second power mode of operation of blender 100. Fourth state 35d may correspond to the third power mode of operation of blender 100. As depicted here, a first transition 31 may transition the mode of operation of blender 100 from first state 35a to second state 35b. A second transition 32 may transition the mode of operation of blender 100 from first state 35a to third state 35c. A third transition 33 may transition the mode of operation of blender 100 from first state 35a to fourth state 35d. A fourth transition 34, a fifth transition 35, and a sixth transition 36 may transition the mode of operation of blender 100 back to first state 35a. First transition 31 may occur responsive to detection of a combination of the first and second types of detection. Second transition 32 may occur responsive to detection of a combination of the first, second, and third types detection. Third transition 33 may occur responsive to detection of a combination of the first and second types of detection, in addition to multiple different detections of the third type of detection. Fourth transition 34, fifth transition 35, and sixth transition 36 may occur responsive to one or more particular detections of a given type of detection (e.g., depletion of the rechargeable battery), and/or automatically after a time-out.

Figure 3G:
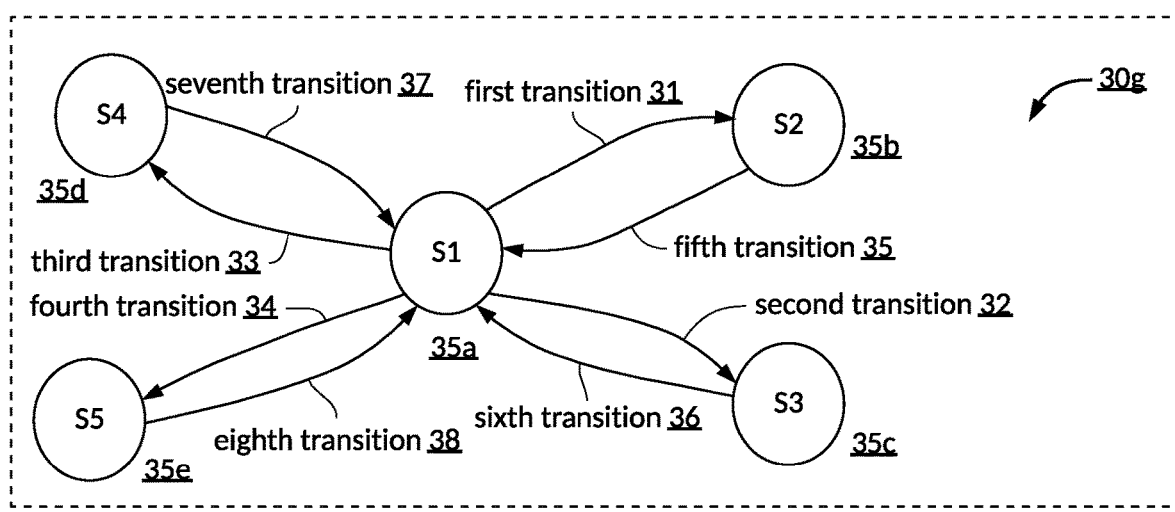

By way of non-limiting example, FIG. 3G illustrates state transitions in a state diagram 30f as may be used by blender 100, e.g., responsive to different types of detections as described elsewhere in this disclosure. As depicted, state diagram 30f may include a first state 35a (labeled "S1"), a second state 35b (labeled "S2"), a third state 35c (labeled "S3"), a fourth state 35d (labeled "S4"), and a fifth state 35e (labeled "S5"). First state 35a may correspond to a ready-to-blend mode of blender 100. Second state 35b may correspond to the first power mode of operation of blender 100. Third state 35c may correspond to the second power mode of operation of blender 100. Fourth state 35d may correspond to the third power mode of operation of blender 100. Fifth state 35e may correspond to a fourth power mode of operation of blender 100. As depicted here, a first transition 31 may transition the mode of operation of blender 100 from first state 35a to second state 35b. A second transition 32 may transition the mode of operation of blender 100 from first state 35a to third state 35c. A third transition 33 may transition the mode of operation of blender 100 from first state 35a to fourth state 35d. A fourth transition 34 may transition the mode of operation of blender 100 from first state 35a to fifth state 35e. A fifth transition 35, a sixth transition 36, a seventh transition 37, and an eighth transition 38 may transition the mode of operation of blender 100 back to first state 35a. First transition 31 may occur responsive to detection of a combination of the first and second types of detection. Second transition 32 may occur responsive to detection of a combination of the first and second types of detection, in addition to a third type of detection that electrical power is available through the USB port in the base assembly. Third transition 33 may occur responsive to detection of a combination of the first and second types of detection, in addition to a different detection of the third type, that electrical power is available through the charging structure, which may provide wireless power transfer. Fourth transition 34 may occur responsive to detection of a combination of the first and second types of detection, in addition to multiple different and/or simultaneous detections of the third type, that electrical power is available both through the charging structure, which may provide wireless power transfer, and through the USB port. Fifth transition 35, sixth transition 36, seventh transition 37, and eighth transition 38 may occur responsive to one or more particular detections of a given type of detection (e.g., depletion of the rechargeable battery), and/or automatically after a time-out.

In some implementations, control circuitry 17 may be configured to support an empty-battery power mode of operation, during which no electrical power is provided by (and/or insufficient electrical power is available through) rechargeable battery 15, but power is provided to electrical motor 14 through one or more charging interfaces 25.

Figure 2:
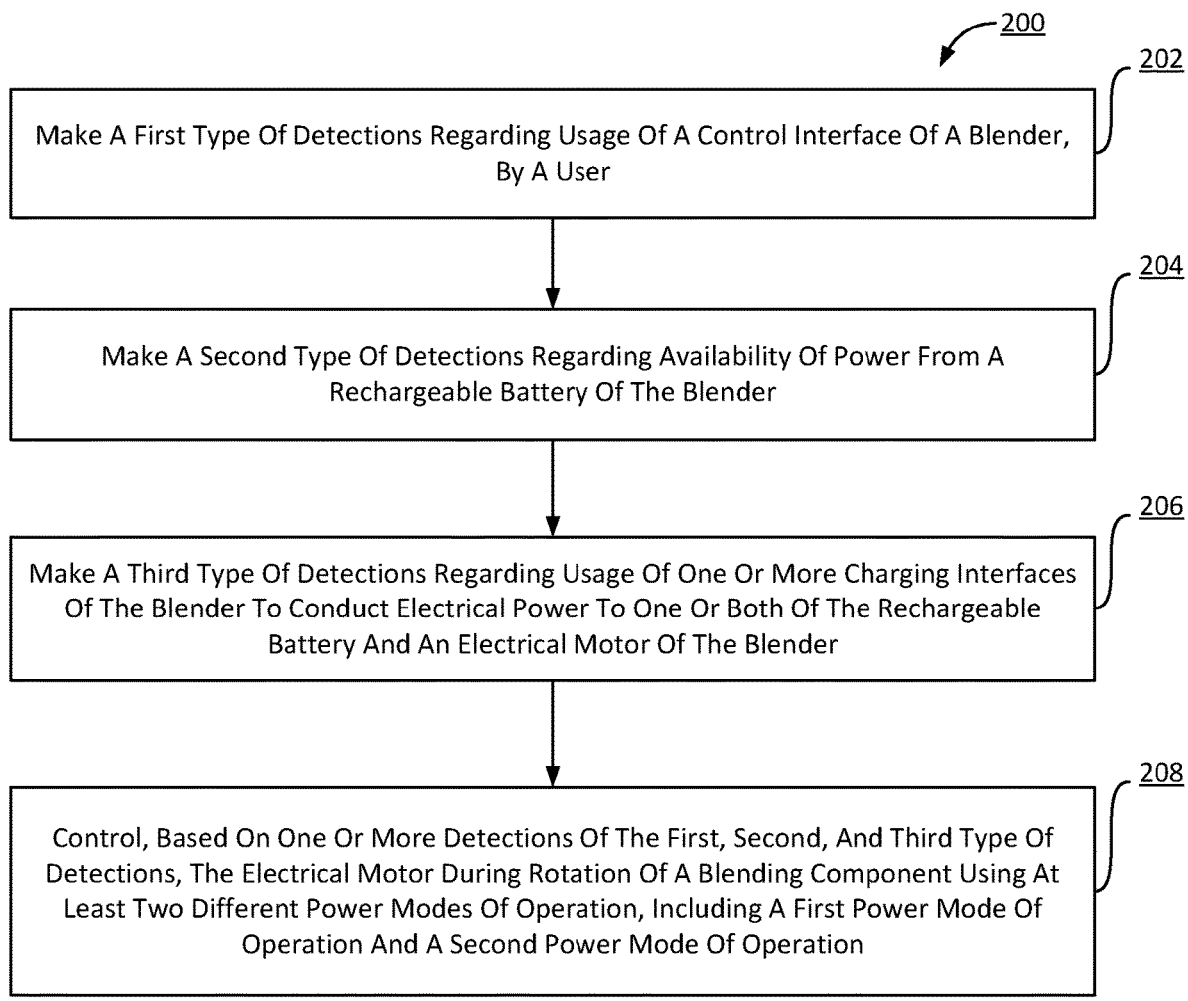
FIG. 2 shows a method for controlling operation of a blender to blend foodstuffs using different power modes of operation, in accordance with one or more implementations.

FIG. 2 illustrates a method 200 for controlling operation of a blender to blend foodstuffs using different power modes, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a first type of detections is made regarding usage of the control interface by a user. In some embodiments, operation 202 is performed by control circuitry the same as or similar to control circuitry 17 (shown in FIG. 1 and described herein).

At an operation 204, a second type of detections is made regarding availability of power from the rechargeable battery. In some embodiments, operation 204 is performed by control circuitry the same as or similar to control circuitry 17 (shown in FIG. 1 and described herein).

At an operation 206, a third type of detections is made regarding usage of the one or more charging interfaces to conduct electrical power to one or both of the rechargeable battery and the electrical motor. In some embodiments, operation 206 is performed by control circuitry the same as or similar to control circuitry 17 (shown in FIG. 1 and described herein).

At an operation 208, the electrical motor is controlled, based on one or more detections of the first, second, and third type of detections, during rotation of the blending component using at least two different power modes of operation, including a first power mode of operation and a second power mode of operation. During the first power mode of operation, a first amount of electrical power is provided by the rechargeable battery to the electrical motor such that the blending component is configured to rotate at a first rotational speed. The first rotational speed is limited in the first power mode of operation by a first rotational speed limit, wherein, in the first power mode of operation, the electrical motor is powered only by the rechargeable battery, and wherein, during the second power mode of operation, a second amount of electrical power is provided to the electrical motor. The second amount of electrical power is provided conjointly by the rechargeable battery and through at least one of the one or more charging interfaces such that the blending component is configured to rotate at a second rotational speed. The second rotational speed is limited in the second power mode of operation by a second rotational speed limit. The second amount of electrical power is greater than the first amount of electrical power. The second rotational speed limit is greater than the first rotational speed limit. In some embodiments, operation 208 is performed by control circuitry the same as or similar to control circuitry 17 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A blender configured to blend foodstuffs using different power modes, wherein blending occurs during blending operations having a blending duration, the blender comprising:
   a blending component configured to blend the foodstuffs during the blending operations;
   an electrical motor configured to drive rotation of the blending component;
   a rechargeable battery configured to power the electrical motor;
   one or more charging interfaces configured to conduct electrical power to one or both of the rechargeable battery and the electrical motor;
   a charging structure including at least one magnet, wherein the charging structure is configured to provide increased stability of the blender during charging and/or blending;
   a control circuitry configured to:

make a first type of detections regarding availability of power from the rechargeable battery;
make a second type of detections regarding usage of the one or more charging interfaces to conduct the electrical power to one or both of the rechargeable battery and the electrical motor;
control, based on one or more detections of the first and second type of detections, the electrical motor during the rotation of the blending component using at least two different power modes of operation, including a first power mode of operation and a second power mode of operation, wherein:
  (i) during the first power mode of operation, a first amount of electrical power is provided by the rechargeable battery to the electrical motor during a first blending operation, and
  (ii) during the second power mode of operation, a second amount of electrical power is provided to the electrical motor during a second blending operation, wherein the second amount of electrical power is provided conjointly by the rechargeable battery and through at least one of the one or more charging interfaces, wherein the second amount of electrical power is greater than the first amount of electrical power.

2. The blender of claim 1, further comprising a control interface configured to control operation of the blender upon usage of the control interface by a user, wherein the control interface includes a button configured to be pushed by the user.

3. The blender of claim 2, wherein, responsive to:
a first detection of the first type of detections that the power from the rechargeable battery is available, and
a second detection of the second type of detections that none of the one or more charging interfaces are being used to conduct the electrical power,
the control circuitry is configured to control the electrical motor using the first power mode of operation.

4. The blender of claim 2, wherein responsive to:
a first detection of the first type of detections that the power from the rechargeable battery is available, and
a second detection of the second type of detections that at least one of the one or more charging interfaces is being used to conduct the electrical power,
the control circuitry is configured to control the electrical motor using the second power mode of operation.

5. The blender of claim 1, wherein the one or more charging interfaces include a first charging interface and a second charging interface, wherein the first charging interface is a universal serial bus port, wherein the second charging interface is a wireless charging interface that includes a secondary coil, wherein the second charging interface supports inductive charging through a charging structure that includes a primary coil, and wherein the charging structure is powered through an external power source that is external to the blender.

6. The blender of claim 1, wherein the first blending operation has a first duration, wherein the second blending operation has a second duration, and wherein the second duration is greater than the first duration.

7. The blender of claim 1, wherein the control circuitry is configured to rotate the blending component at a first rotational speed during the first blending operation, wherein the control circuitry is configured to rotate the blending component at a second rotational speed during the second blending operation, and wherein the second rotational speed is greater than the first rotational speed.

8. The blender of claim 1, wherein the one or more charging interfaces include a first charging interface and a second charging interface, wherein the first charging interface is a universal serial bus port, wherein the second charging interface is a wired charging interface configured to couple electrically with an external power source that is external to the blender.

9. The blender of claim 1, wherein the first power mode of operation and the second power mode of operation are mutually exclusive.

10. The blender of claim 1, wherein the blender is a portable and rechargeable blender, wherein the second amount of power is at least 20% greater than the first amount of power.

11. A method for controlling operation of a blender to blend foodstuffs using different power modes, wherein blending occurs during blending operations having a blending duration, the method comprising:
making a first type of detections regarding availability of power from a rechargeable battery;
making a second type of detections regarding usage of one or more charging interfaces to conduct electrical power to one or both of the rechargeable battery and an electrical motor; providing increased stability of the blender during charging and/or blending using a charging structure including at least one magnet; and
controlling, based on one or more detections of the first and second type of detections, the electrical motor during rotation of a blending component using at least two different power modes of operation, including a first power mode of operation and a second power mode of operation, wherein:
  (i) during the first power mode of operation, a first amount of electrical power is provided by the rechargeable battery to the electrical motor during a first blending operation, and
  (ii) during the second power mode of operation, a second amount of electrical power is provided to the electrical motor during a second blending operation, wherein the second amount of electrical power is provided conjointly by the rechargeable battery and through at least one of the one or more charging interfaces, wherein the second amount of electrical power is greater than the first amount of electrical power.

12. The method of claim 11, wherein a control interface includes a button that a user can push to control the operations of the blender.

13. The method of claim 12, wherein, responsive to:
a first detection of the first type of detections that the power from the rechargeable battery is available, and
a second detection of the second type of detections that none of the one or more charging interfaces are being used to conduct the electrical power,
controlling the electrical motor includes controlling the electrical motor using the first power mode of operation.

14. The method of claim 12, wherein responsive to:
a first detection of the first type of detections that the power from the rechargeable battery is available, and
a second detection of the second type of detections that at least one of the one or more charging interfaces is being used to conduct the electrical power,
controlling the electrical motor includes controlling the electrical motor using the second power mode of operation.

15. The method of claim 11, wherein the one or more charging interfaces include a first charging interface and a second charging interface, wherein the first charging interface is a universal serial bus port, wherein the second charging interface is a wireless charging interface that includes a secondary coil, wherein the second charging interface supports inductive charging through a charging structure that includes a primary coil, the method further comprising:

powering the charging structure through an external power source that is external to the blender.

16. The method of claim 11, wherein the first blending operation has a first duration, wherein the second blending operation has a second duration, and wherein the second duration is greater than the first duration.

17. The method of claim 11, wherein the control circuitry rotates the blending component at a first rotational speed during the first blending operation, wherein the control circuitry rotates the blending component at a second rotational speed during the second blending operation, and wherein the second rotational speed is greater than the first rotational speed.

18. The method of claim 11, wherein the first power mode of operation and the second power mode of operation are mutually exclusive.

19. The method of claim 11, wherein the second amount of power is at least 20% greater than the first amount of power.

\* \* \* \* \*